United States Patent
Mulderij

(10) Patent No.: US 10,167,852 B2
(45) Date of Patent: Jan. 1, 2019

(54) SADDLE AND HOOK SYSTEM

(71) Applicant: IHC Holland IE B.V., Sliedrecht (NL)

(72) Inventor: Klaas-Jan Mulderij, Delfgauw (NL)

(73) Assignee: IHC Holland IE B.V., Sliedrecht (NL)

(*) Notice: Subject to any disclaimer, the term of this patent is extended or adjusted under 35 U.S.C. 154(b) by 246 days.

(21) Appl. No.: 15/106,336

(22) PCT Filed: Dec. 18, 2014

(86) PCT No.: PCT/NL2014/050875
§ 371 (c)(1),
(2) Date: Jun. 20, 2016

(87) PCT Pub. No.: WO2015/093950
PCT Pub. Date: Jun. 25, 2015

(65) Prior Publication Data
US 2018/0163704 A1    Jun. 14, 2018

(30) Foreign Application Priority Data
Dec. 19, 2013    (NL) .................................. 2011985

(51) Int. Cl.
*F03D 13/25* (2016.01)
*E02D 27/42* (2006.01)
(Continued)

(52) U.S. Cl.
CPC ............. *F03D 13/25* (2016.05); *B63B 9/065* (2013.01); *B63B 35/003* (2013.01); *B63B 35/28* (2013.01);
(Continued)

(58) Field of Classification Search
CPC combination set(s) only.
See application file for complete search history.

(56) References Cited

U.S. PATENT DOCUMENTS 7,112,010 B1 *  9/2006  Geiger .................... B66C 23/52
                                                   405/195.1
8,251,004 B2 *  8/2012  Olsen .................... B63B 35/003
                                                   114/258
(Continued)

FOREIGN PATENT DOCUMENTS

EP   2372143 A1      10/2011
FR   2896765 A1 *    8/2007  ............. B63B 23/32
GB   2394498 A       4/2004

OTHER PUBLICATIONS

Dennis Denney et al: "Pile-Guiding Tool", Journal of Petroleum Technology, Mar. 7, 2013 (Mar. 7, 2013), XP055142012, p. 3-4, figure 4.
(Continued)

*Primary Examiner* — Kyle Armstrong
(74) *Attorney, Agent, or Firm* — N.V. Nederlandsch Octrooibureau; Tamara C. Stegmann; Lindsey A. Auerbach

(57) ABSTRACT

The invention relates to a pile upending system for upending a pile such as a monopile for the foundation of offshore wind turbines, the pile upending system comprising;
  a pivotally mounted pile support frame having a seat for engaging an outside wall of a pile, the pile support frame being pivotable around a support frame axis of rotation for allowing the seat to support the pile during upending,
  a cable system for supporting an, in use outboard, end of a pile, comprising one or more tensioned or tensionable cables having an outboard end provided with a hoisting member for supporting the outboard end of the pile during upending of said pile,
  an outboard support system comprising a frame member for, in use, extending outboard and supporting the hoisting member of the cable system, (Continued)

wherein the outboard support system is arranged with respect to the pile support frame such that the frame member extends transverse with respect to the support frame axis of rotation for arranging the hoisting member at a distance from the seat and aligned with the seat such that a pile may engage the hoisting member upon longitudinal movement of the pile along the seat.

16 Claims, 5 Drawing Sheets

(51) Int. Cl.
  *E02B 17/00* (2006.01)
  *B63B 35/28* (2006.01)
  *B66C 1/56* (2006.01)
  *B63B 9/06* (2006.01)
  *B63B 35/00* (2006.01)
  *F03D 13/10* (2016.01)
  *F03D 13/20* (2016.01)
  *E02D 27/14* (2006.01)

(52) U.S. Cl.
  CPC ............... *B66C 1/56* (2013.01); *E02D 27/14* (2013.01); *E02D 27/425* (2013.01); *F03D 13/10* (2016.05); *F03D 13/22* (2016.05); *E02B 2017/0047* (2013.01); *E02B 2017/0065* (2013.01); *E02B 2017/0091* (2013.01); *F05B 2240/95* (2013.01); *Y02E 10/727* (2013.01)

(56) References Cited

U.S. PATENT DOCUMENTS

| | | | | |
|---|---|---|---|---|
| 8,496,423 | B2* | 7/2013 | Springett | ............... B63B 27/16 |
| | | | | 414/10 |
| 9,809,943 | B2* | 11/2017 | Bonnemaison | ......... E02B 17/02 |
| 2005/0286979 | A1* | 12/2005 | Watchorn | ............... E02B 17/00 |
| | | | | 405/224 |
| 2011/0200425 | A1* | 8/2011 | Weaver | ................. B63B 35/44 |
| | | | | 415/7 |
| 2017/0370068 | A1* | 12/2017 | Mulderij | ................ E02D 27/42 |

OTHER PUBLICATIONS

Manfred Beyer et al: "New Bauer Flydrill system drilling monopiles at Barrow Offshore Wind Farm, UK", Bauer Maschinen GmbH, Oct. 21, 2011 (Oct. 21, 2011), XP055142024, p. 6, figures 11-13.
Remco Löwenthali et al: "IHC Handling Systems", Oct. 16, 2009 (Oct. 16, 2009), XP055142003, p. 20-21.

* cited by examiner

SADDLE AND HOOK SYSTEM

The present invention relates to a pile upending system and a method for upending a monopile for the foundation of offshore wind turbines.

GB2226539 A discloses a system for offshore construction work wherein a pile is upended using two cranes one of which cranes is connected via a sling to one end of the pile and the other of which cranes is connected via a sling to two spaced apart connection points on the pile but whose line of action is to the other side of the centre of gravity (c) than the sling. A spreader bar maintains the separation between the connection points during upending. The sling is trained around a sheave so that both slings share the load of the pile equally during upending which is achieved by raising or lowering one sling relative to the other. The three point lift arrangement avoids excessive bending stress on the pile.

It is known to upend a pile offshore wherein an outboard end of a pile rests on a support where around the pile cants. During upending an outboard end is supported by a cable provided with a hook.

Mono-piles, like for supporting a wind turbine, have a large diameter like up to 4 to 6 meters and may weigh hundreds of tonnes. These piles are transported from their production site, to for instance a wind turbine park, in a horizontal stance. These piles are finally used in a vertical stance. Therefore, these piles are upended from a horizontal to a vertical stance on site. This upending is a difficult task since such a pile is a thin walled structure and prone to local bending stresses. In addition, outboard operations in the proximity of the pile may be dangerous for personnel.

SUMMARY OF THE INVENTION

Therefore, the current invention aims to provide a pile upending system which is safer for personnel during operations.

Another object of the invention is to improve a prior pile upending system in that a problem associated therewith is at least partly solved.

Yet another object of the invention is to provide an alternative pile upending system.

According to a first aspect of the invention this is realized with a pile upending system for upending a pile such as a monopile for the foundation of offshore wind turbines, the pile upending system comprising;

a pivotally mounted pile support frame having a seat for engaging an outside wall of a pile, the pile support frame being pivotable around a support frame axis of rotation for allowing the seat to support the pile during upending, a cable system for supporting an, in use outboard, end of a pile, comprising one or more tensioned or tensionable cables having an outboard end provided with a hoisting member for supporting the outboard end of the pile during upending of said pile, an outboard support system comprising a frame member for, in use, extending outboard and supporting the hoisting member of the cable system, wherein the outboard support system is arranged with respect to the pile support frame such that the frame member extends transverse with respect to the support frame axis of rotation for arranging the hoisting member at a distance from the seat and aligned with the seat such that a pile may engage the hoisting member upon longitudinal movement of the pile along the seat.

This enables to omit outboard operations by personnel below the pile. This increases safety of the upending operation.

It is noted that in contrast with the invention, FIG. 4 of Dennis Denney ET AL: "Pile-Guiding Tool", Journal of Petroleum Technology, 7 Mar. 2013 fails to disclose the cable system and therefore the support of the hoisting member of the cable system. Instead Dennis Denney ET AL shows a pivotally mounted pile support frame and an outboard support frame for supporting the end of the pile. In contrast with the current invention, the outboard support frame of Dennis Denney ET AL has a fixed length which offers no flexibility during operation when it is desirable to increase the outboard part of the pile.

Likewise, Manfred Beyer ET AL: "New BAUER Flydrill system drilling monopiles at Barrow Offshore Wind Farm, UK", BAUER Maschinen GmbH, D-865292 Schrobenhausen, Germany, 21 Oct. 2011 does not disclose the cable system and therefore the support of the hoisting member of the cable system. Instead, Beyer discloses a pile handling system which holds the pile in a frame on deck while upending the pile and a smaller outboard frame guides the pile while being driven.

Remco Löwenthal ET AL: "IHC Handling Systems", 16 Oct. 2009 discloses a saddle and hook concept with a holding frame and a cable and hook system to hold the end of the pile during upending of the pile. However Löwenthal does not disclose an outboard support system comprising a frame member for, in use, extending outboard and supporting the hoisting member of the cable system. Therefore Löwenthal requires more outboard operations, which is highly undesirable.

GB2394498 (Engineering Business, 28-4-2004), shows a pivoting frame for installing a wind turbine on a structure directly onto a submerged pile using an A-frame that can be moved using a winch-cable system. GB2394498 does not disclose the cable system and therefore the support of the hoisting member of the cable system. Instead, when the structure is in its upright position, thus after upending, a guide or pull wire is attached to the end part of the structure. The guide wire is used to guide the end part of the structure into a pre-positioned foundation, see page 8 lines 7-9.

In an embodiment of the pile upending system according to the invention, a frame member inboard end is coupled with the pile support frame such that the frame member pivots with the pile support frame. This assures that the hoisting member maintains aligned with the seat such that a pile engages the hoisting member upon longitudinal movement of the pile along the seat.

In an embodiment of the pile upending system, the frame member forms a unit with the pile support frame such that the frame member pivots with the pile support frame in unity. This even more assures that the hoisting member maintains aligned with the seat.

In an embodiment of the pile upending system, the pile support frame is pivotally mounted through a spherical bearing that allows the support frame to rotate around the support frame axis of rotation and around axes transverse with respect to the support frame axis of rotation. In this manner, it is possible to optimize the engagement of the seat with the outside wall of a pile when, for example, a crane driver moves the upper end of the pile away from the theoretical upending plane.

In an embodiment, the pile upending system comprises a support frame constraint system for constraining the pile support frame movement in that the support frame is allowed to rotate around a defined axes transverse with respect to the support frame axis of rotation. In this manner, it is possible to support the seat over an increased area rather than alone with the spherical bearing. This way, mechanical stress is reduced.

In an embodiment of the pile upending system, the support frame constraint system extends on both opposite sides of the spherical bearing. This way, the spherical bearing is symmetrically disburdened.

In an embodiment of the pile upending system, the support frame constraint system comprises a cam in cooperation with a slotted hole.

In an embodiment of the pile upending system, the frame member is extendable along its longitudinal axis. This reduces the need for outboard operations by personnel even more.

In an embodiment, the pile upending system comprises a drive system, like a hydraulic cylinder, coupled with the pile support frame for imposing an angular position on the support frame around the support frame axis of rotation.

The invention further relates to a vessel comprising a pile upending system according to the invention.

In an embodiment of the vessel, the support frame axis of rotation extends outboard such that the frame member may take a vertical stance. This reduces the need for outboard operations by personnel even more during the entire upending process.

The invention further relates to a method for upending a pile, in particular a monopile for the foundation of offshore wind turbines, the method comprising;
  pivotable supporting the pile for pivoting around a support frame axis of rotation,
  supporting an, in use outboard, end of the pile through a cable system comprising a tensioned or tensionable cable having an outboard end provided with a hoisting member for supporting the outboard end of the pile during upending of said pile,
  supporting the hoisting member of the cable system through an outboard support system comprising a frame member for, in use, extending outboard,
wherein the outboard support system is arranged with respect to the pile support frame such that the frame member extends transverse with respect to the support frame axis of rotation for arranging the hoisting member at a distance from the seat and aligned with the seat such that a pile may engage the hoisting member upon longitudinal movement of the pile along the seat.

The invention further relates to device comprising one or more of the characterising features described in the description and/or shown in the attached drawings.

The invention further relates to method comprising one or more of the characterising features described in the description and/or shown in the attached drawings.

The various aspects discussed in this patent can be combined in order to provide additional advantages.

DESCRIPTION OF THE DRAWINGS

The invention will be further elucidated referring to a preferred embodiment shown in the drawings wherein shown in.

DETAILED DESCRIPTION OF EMBODIMENTS

Figure 1:
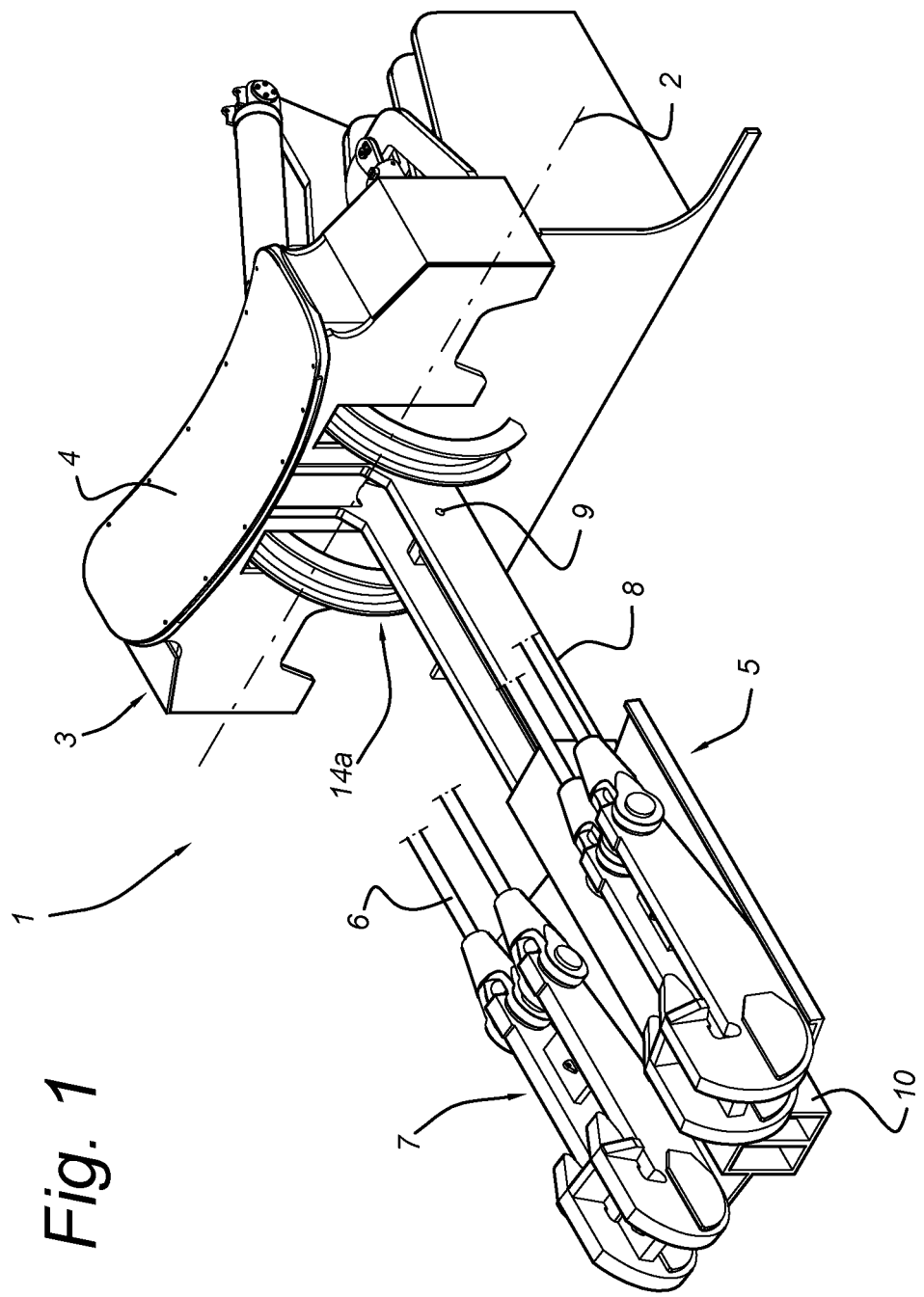
FIG. 1 in perspective view a pile upending system according to the invention.
Figure 2:
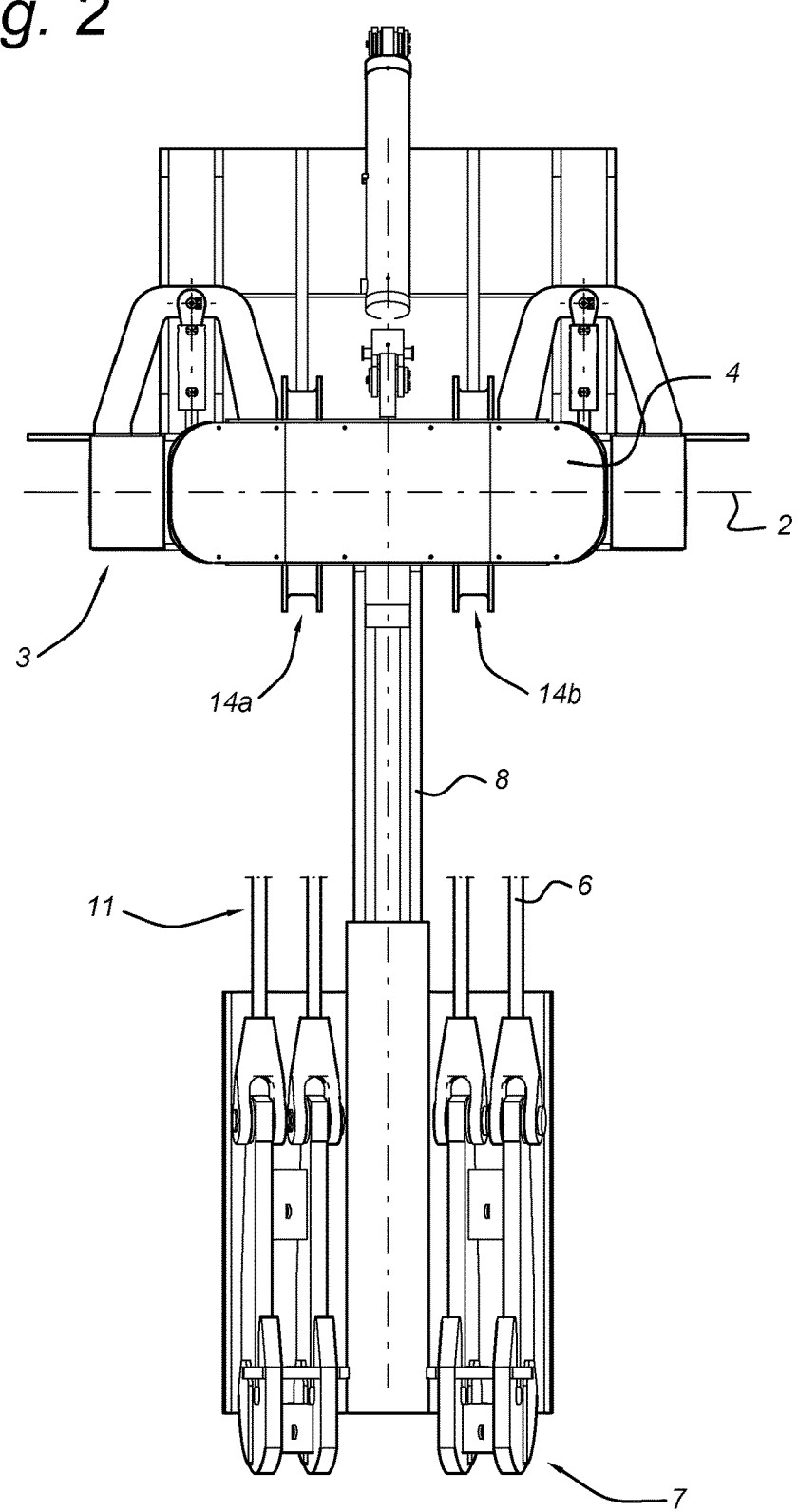
FIG. 2 a top view of the upending system according to FIG. 1.

The invention will be further elucidated referring to all FIGS. 1-5 wherein a preferred embodiment is shown There is shown a pile upending system 1 for upending a monopile for the foundation of offshore wind turbines. Such a monopile (not shown) may have a length of tens of meters and weight hundreds of tonnes.

The pile upending system 1 comprises a pile support frame 3 which supports a lower end of the pile during upending. The upper end of the pile is hoisted by a hoisting device (not shown) during upending of the pile. The pile support frame 3 is pivotally mounted such that the pile support frame 3 is able to pivot around a support frame axis of rotation 2. In this manner the pile support frame 3 may accommodate its position to the actual stance of the pile and move with the pile. Here, the pile support frame 3 is pivotally mounted through a spherical bearing known per se. The spherical bearing allows the pile support frame 3 to rotate around the support frame axis of rotation 2 and around axes transverse with respect to the support frame axis of rotation 2.

The pile support frame 3 is provided with a seat 4 which is configured for engaging an outside wall of a pile. During upending, the seat contacts the outside wall of the pile. During upending, the pile support frame 3 supports the pile through the seat 4.

The pile upending system 1 comprises a cable system 11 (partly shown) for supporting an, in use outboard, end of a pile. The cable system 11 is gradually loaded as the pile occupies its vertical stance. The cable system 11 comprises two tensioned or tensionable cables 6. The cables 6 have an outboard end 12 provided with a hoisting member 7. The hoisting member 7 is configured for supporting the outboard end of the pile during upending of said pile. The hoisting member 7 is configured in that the hoisting member 7 is provided with a recess 13 which recess can accommodate a portion of the pile wall such that the pile may be supported.

The pile upending system 1 comprises an outboard support system 5 having a frame member 8 which is configured for, in use, extending outboard and supporting the hoisting member 7 of the cable system 11. The outboard support system 5 is arranged with respect to the pile support frame 3 such that the frame member 8 extends transverse with respect to the support frame axis of rotation 2. In this manner the hoisting member 7 is arranged at a distance from the seat 4 and aligned with the seat 4 such that a pile may engage the hoisting member 7 upon longitudinal movement of the pile along the seat 4. The distance between the hoisting member 7 and the seat 4 is determined by the length of the frame member 8. The frame member inboard end 9 is coupled with the pile support frame 3 such that the frame member pivots with the pile support frame 3. The frame member outboard end 10 supports the, in this case 2, hoisting members 7. In this case, the frame member 8 forms a unit with the pile support frame 3 such that the frame member 8 pivots with the pile support frame 3 in unity.

The pile upending system 1 comprises a support frame constraint system 14*a*, 14*b* for constraining the pile support frame movement in that the pile support frame 3 is allowed to rotate around a defined axes transverse with respect to the support frame axis of rotation 2. In this case, the support frame constraint system 14a, 14b extends on both opposite sides of the spherical bearing to disburden the spherical bearing in a symmetrical way. More importantly, in this manner the allowed movement of the heavy pile is constrained.

Figure 3:
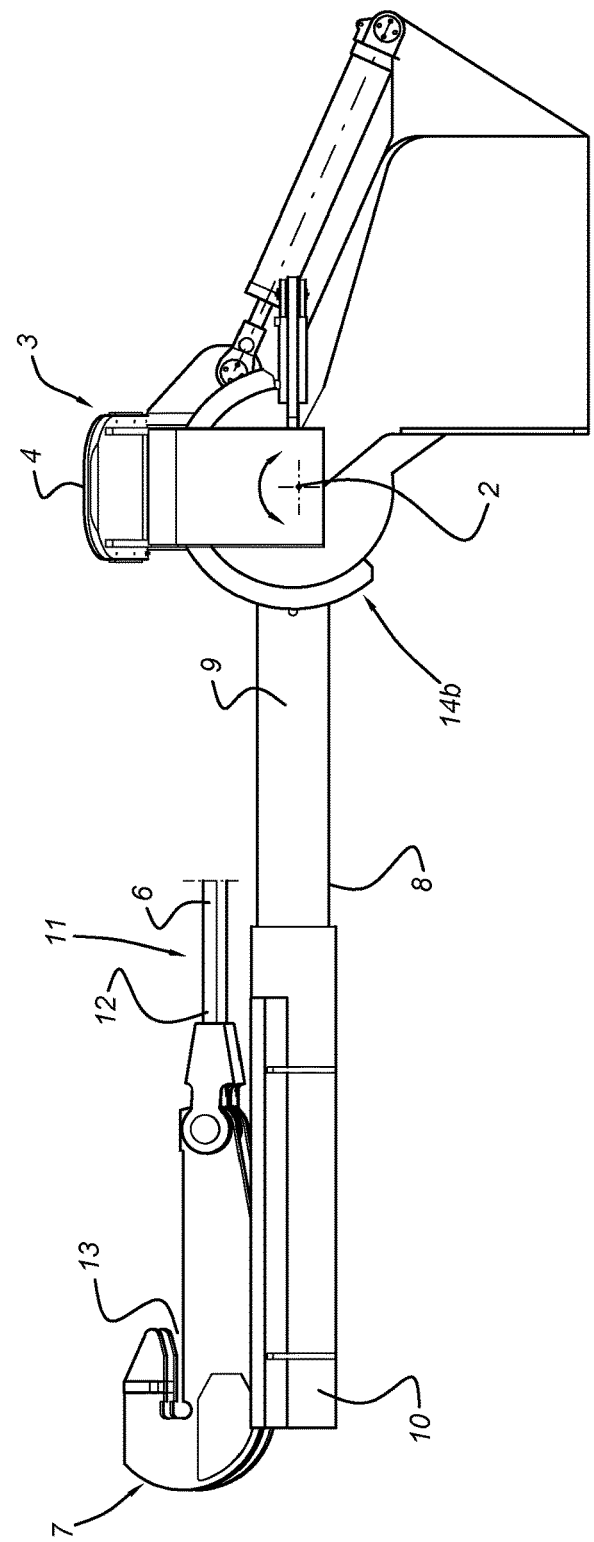
FIG. 3 a side view of the upending system according to FIG. 1.
Figure 4:
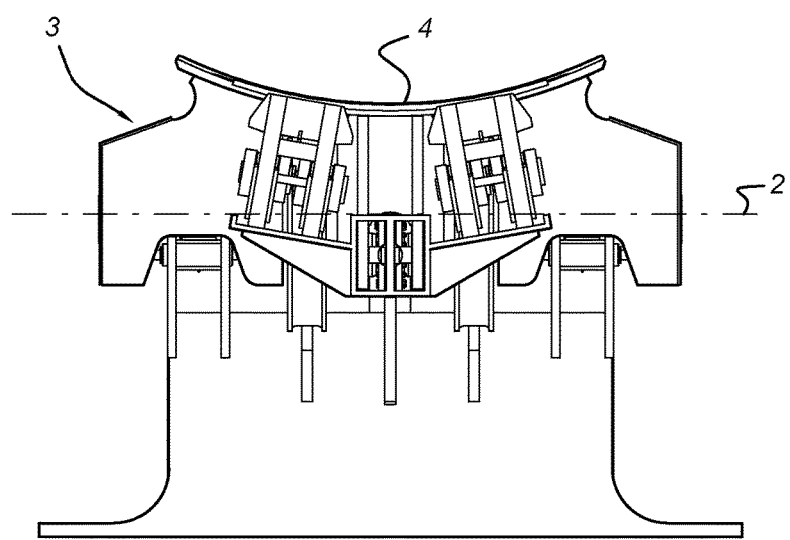
FIG. 4 a front view of the upending system according to FIG. 1.
Figure 5:
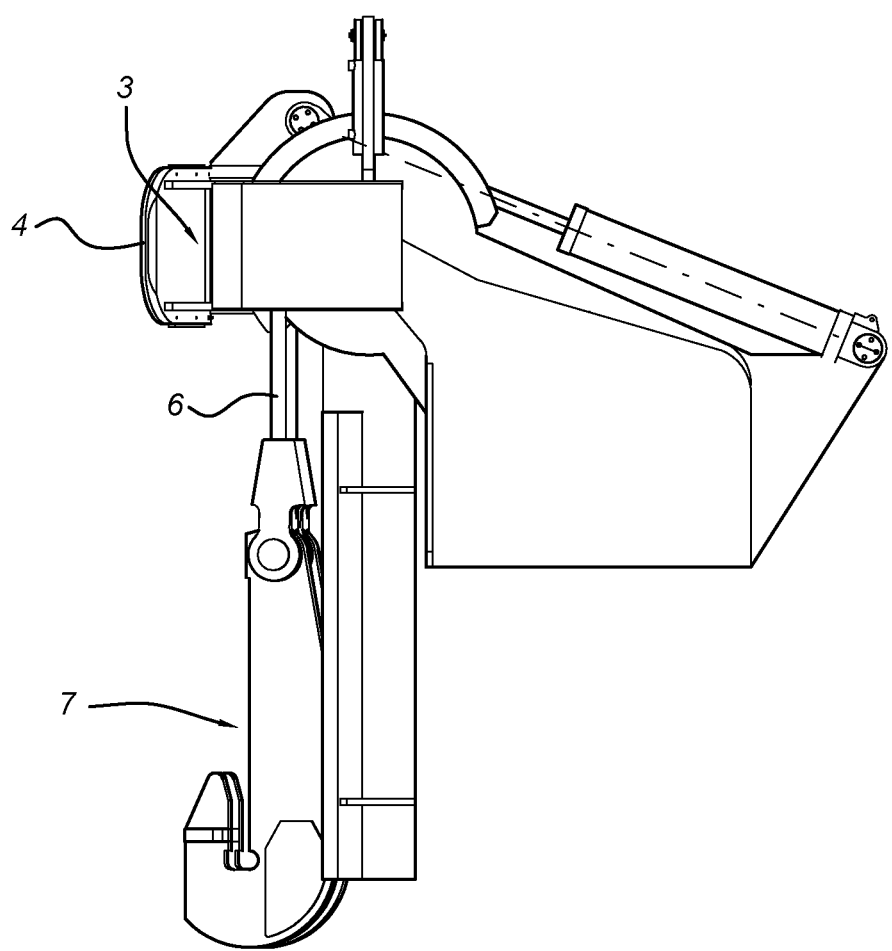
FIG. 5 a side view of the upending system according to FIG. 1, wherein the outboard support system takes up a vertical stance.

In use, the pile upending system is mounted on a vessel. The support frame axis of rotation 2 extends outboard and parallel to a side of the vessel such that the frame member 8 may take a vertical stance. A hydraulic cylinder is coupled with the pile support frame 3 for imposing an angular position on the support frame 3 around the support frame axis of rotation 2. The hydraulic cylinder may impose a vertical stance to the support frame 3 as shown in FIG. 3 or a horizontal stance as shown in FIG. 5.

In using the pile upending system 1 the following methods steps are performed The pile is placed on the seat 4 of the pile support frame for pivoting the pile around a support frame axis of rotation 2. The outboard end of the pile is supported through a cable system 11 comprising a tensioned or tensionable cable 6 having an outboard end provided with a hoisting member 7 for supporting the outboard end of the pile during upending of said pile. The hoisting member 7 of the cable system 11 is supported through an outboard support system 5 comprising a frame member 8 for, in use, extending outboard. The hoisting member 7 is arranged at a distance from the seat 4 and aligned with the seat 4. The pile is moved longitudinally along the seat 4, and finally the pile engages the hoisting member 7 and the outboard end of the pile is supported through the cable system 11.

It will also be obvious after the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

The invention claimed is:

1. A pile upending system for upending a pile, the pile upending system comprising;
    a pivotally mounted pile support frame having a seat for engaging an outside wall of a pile, the pile support frame being pivotable around a support frame axis of rotation for allowing the seat to support the pile during upending,
    a cable system comprising one or more tensioned or tensionable cables and a hoisting member, the hoisting member connected to the outboard end of the pile for supporting the outboard end of the pile during upending of said pile, and the, one or more tensioned or tensionable cables having an outboard end connected to the hoisting member, and
    an outboard support system comprising a frame member for, in use, extending outboard and supporting the hoisting member of the cable system,
    wherein the outboard support system is arranged with respect to the pile support frame such that the frame member extends transverse with respect to the support frame axis of rotation for arranging the hoisting member at a distance from the seat and aligned with the seat such that a pile engages the hoisting member upon longitudinal movement of the pile along the seat.

2. The pile upending system according to claim 1, wherein a frame member inboard end is coupled with the pile support frame such that the frame member pivots with the pile support frame.

3. The pile upending system according to claim 2, wherein the frame member forms a unit with the pile support frame such that the frame member pivots with the pile support frame in unity.

4. The pile upending system according to claim 1, wherein the pile support frame is pivotally mounted to allow the support frame to rotate around the support frame axis of rotation and around axes transverse with respect to the support frame axis of rotation.

5. The pile upending system according to claim 1, comprising a support frame constraint system for constraining the pile support frame movement in that the support frame is allowed to rotate around a defined axes transverse with respect to the support frame axis of rotation.

6. The pile upending system according to claim 5, wherein the support frame constraint system extends on both opposite sides of the pivotal mount of the pile support frame.

7. The pile upending system according to claim 5, wherein the support frame constraint system comprises a cam in cooperation with a slotted hole.

8. The pile upending system according to claim 1, wherein the frame member is extendable along its longitudinal axis.

9. The pile upending system according to claim 1, comprising a drive system, coupled with the pile support frame for imposing an angular position on the support frame around the support frame axis of rotation.

10. The pile upending system according to claim 9, wherein the drive system comprises an hydraulic cylinder.

11. A vessel comprising a pile upending system according to claim 1.

12. The vessel according to claim 11, wherein the support frame axis of rotation extends outboard such that the frame member may takes a vertical stance.

13. The pile upending system according to claim 1, wherein the hoisting member comprises a recess to accommodate a portion of the pile wall.

14. The pile upending system according to claim 1, wherein the hoisting member comprises one or more hooks connected to an outboard end of the one or more tensioned or tensionable cables.

15. The pile upending system according to claim 1, wherein the hoisting member connects to the one or more tensioned or tensionable cables through a rotatable connection.

16. A method for upending a pile, in particular a monopile for the foundation of offshore wind turbines, the method comprising;
    pivotable supporting the pile for pivoting around a support frame axis of rotation,
    supporting an outboard end of the pile through a hoisting member connecting to an outboard end of a pile during upending of said pile, said cable system further comprising a tensioned or tensionable cable having an outboard end which connects to the hoisting member,
    supporting the hoisting member of the cable system through an outboard support system comprising an frame member for, in use, extending outboard,
    wherein the outboard support system is arranged with respect to the pile support frame such that the frame member extends transverse with respect to the support frame axis of rotation for arranging the hoisting member at a distance from the seat and aligned with the seat such that a pile engages the hoisting member upon longitudinal movement of the pile along the seat.

\* \* \* \* \*